US012722635B2

(12) United States Patent
Oishio

(10) Patent No.: US 12,722,635 B2
(45) Date of Patent: Sep. 1, 2026

(54) VEHICLE TRAVEL CONTROL DEVICE, METHOD, AND STORAGE MEDIUM

(71) Applicant: TOYOTA JIDOSHA KABUSHIKI KAISHA, Toyota (JP)

(72) Inventor: Takuya Oishio, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/964,681

(22) Filed: Dec. 2, 2024

(65) Prior Publication Data

US 2025/0263071 A1 Aug. 21, 2025

(30) Foreign Application Priority Data

Feb. 16, 2024 (JP) ................................ 2024-021867

(51) Int. Cl.
*B60W 30/14* (2006.01)
*B60W 10/04* (2006.01)
*B60W 10/184* (2012.01)

(52) U.S. Cl.
CPC .......... *B60W 30/143* (2013.01); *B60W 10/04* (2013.01); *B60W 10/184* (2013.01); *B60W 2540/10* (2013.01); *B60W 2710/18* (2013.01)

(58) Field of Classification Search
None
See application file for complete search history.

(56) References Cited

U.S. PATENT DOCUMENTS

| | | | |
|---|---|---|---|
| 8,355,851 B2 | 1/2013 | Inoue et al. | |
| 8,370,040 B2 | 2/2013 | Inoue et al. | |
| 8,417,430 B2 | 4/2013 | Saeki | |
| 8,548,709 B2 | 10/2013 | Morita | |
| 8,768,597 B2 | 7/2014 | Kagawa | |
| 9,174,643 B2 | 11/2015 | Aso | |
| 10,017,178 B2 | 7/2018 | Morimoto et al. | |
| 10,118,617 B2 | 11/2018 | Urano et al. | |
| 10,486,698 B2 | 11/2019 | Masui et al. | |
| 2009/0240413 A1* | 9/2009 | Miyajima ......... | B60W 50/0098 701/70 |

(Continued)

FOREIGN PATENT DOCUMENTS

| | | |
|---|---|---|
| JP | H09-277851 A | 10/1997 |
| JP | 2009-144571 A | 7/2009 |
| JP | 2017-001406 A | 1/2017 |

*Primary Examiner* — Hongye Liang
(74) *Attorney, Agent, or Firm* — SoraIP, Inc.

(57) ABSTRACT

A drive control device for controlling driving force of a vehicle includes a braking control device for applying braking force to a wheel, and a driving assistance ECU for controlling the drive control device to execute vehicle speed limit control for executing a driving force limit when the vehicle speed exceeds a limited vehicle speed. The driving assistance ECU is a vehicle travel control device for executing override control for releasing execution of the driving force limit until the vehicle speed becomes equal to or lower than the limited vehicle speed when the accelerator operation amount ACC is increased by a driver during execution of the vehicle speed limit control, and the driving assistance ECU controls the braking control device to decelerate the vehicle when the time when the accelerator operation amount is zero becomes equal to or longer than a reference time during execution of the override control.

6 Claims, 5 Drawing Sheets

(56) References Cited

U.S. PATENT DOCUMENTS

| | | | | |
|---|---|---|---|---|
| 2016/0355183 | A1 | 12/2016 | Nakade | |
| 2019/0295419 | A1 | 9/2019 | Tosa et al. | |
| 2025/0108799 | A1 * | 4/2025 | Oniwa | B60W 30/12 |

* cited by examiner 102
100
DRIVING SUPPORT ECU
10
CAMERA SENSOR
12
18
RADAR SENSOR
14
104
SETTING OPERATION DEVICE
16
16A
26
22
DRIVE ECU
20
DRIVE DEVICE
24
36
32
BRAKING ECU
30
BRAKE DEVICE
34
METER ECU
50
DISPLAY
52
DRIVING OPERATION SENSOR
60
60A
60B
VEHICLE STATE SENSOR
70
NAVIGATION DEVICE
80

FIG. 4

EMBODIMENTS
PRIOR ART
VEHICLE SPEED V
Vlim
0
TIME
ACCELERATION
(+)
(−)
Gbtmax
t1
t2
t3
t4
t5
t6
t7
t8
Tc
ACCELERATOR OPERATION AMOUNT ACC
100%
0%
FLAG For
1
0
DURING VEHICLE SPEED LIMIT
OVERRIDING
DURING VEHICLE SPEED LIMIT

VEHICLE TRAVEL CONTROL DEVICE, METHOD, AND STORAGE MEDIUM

CROSS-REFERENCE TO RELATED APPLICATION

This application claims priority to Japanese Patent Application No. 2024-021867 filed on Feb. 16, 2024, incorporated herein by reference in its entirety.

BACKGROUND

1. Technical Field

The present disclosure relates to a travel control device, method, and a storage medium to be applied to a vehicle such as an automobile.

2. Description of Related Art

As travel control in a vehicle such as an automobile, there is known vehicle speed limit control in which a drive force of the vehicle is limited when the vehicle speed exceeds a limit vehicle speed (set vehicle speed). Further, it is known that, when a predetermined driving operation is performed by a driver while the drive force is limited by the vehicle speed limit control, override control for canceling the limitation on the drive force is executed to allow the vehicle speed to become equal to or more than the limit vehicle speed. It is also known that the override control is terminated when the vehicle speed becomes equal to or less than the limit vehicle speed.

For example, Japanese Unexamined Patent Application Publication No. 2009-144571 (JP 2009-144571 A) by the present applicant describes an example of a vehicle speed limit device configured to perform vehicle speed limit control and override control.

SUMMARY

In the conventional travel control device that performs the vehicle speed limit control and the override control, the override control is terminated when the driving operation amount is reduced by the driver and the vehicle speed becomes equal to or less than the limit vehicle speed. In a situation in which the override control is executed, the driver may reduce the driving operation amount until the accelerator operation amount becomes 0, for example, in order to reduce the vehicle speed. In this case, the vehicle speed is reduced only by the engine brake or the like, and therefore it takes time for the vehicle speed to become equal to or less than the limit vehicle speed. Thus, the override control may not be terminated early as desired by the driver.

Further, when the driver attempts to terminate the override control as desired, the driver must shift the drive operation from the driving operation by the accelerator pedal to the braking operation by the brake pedal, making the driver feel annoyed.

The present disclosure provides a travel control device, method, and program capable of terminating override control during vehicle speed limit control earlier than the related art without shifting a drive operation from a driving operation to a braking operation.

An aspect of the present disclosure provides a vehicle travel control device including a drive control device that controls a drive force of a vehicle according to at least an accelerator operation amount, a braking control device that decelerates the vehicle by applying a braking force to wheels, and a control unit that executes vehicle speed limit control for limiting the drive force by controlling the drive control device when a vehicle speed exceeds a limit vehicle speed, the control unit being configured to execute override control for canceling limitation on the drive force until the vehicle speed becomes equal to or less than the limit vehicle speed when the accelerator operation amount is increased by a driver during execution of the vehicle speed limit control.

The control unit is configured to decelerate the vehicle by controlling the braking control device when a time for which the accelerator operation amount is 0 becomes equal to or longer than a reference time in a situation in which the override control is being executed.

Another aspect of the present disclosure provides a vehicle drive control method to be applied to a vehicle including a drive control device that controls a drive force of a vehicle according to at least an accelerator operation amount and a braking control device that decelerates the vehicle by applying a braking force to wheels, the method including executing vehicle speed limit control for limiting the drive force by controlling the drive control device when a vehicle speed exceeds a limit vehicle speed, and executing override control for canceling limitation on the drive force until the vehicle speed becomes equal to or less than the limit vehicle speed when the accelerator operation amount is increased by a driver during execution of the vehicle speed limit control.

The travel control method further includes decelerating the vehicle by controlling the braking control device when a time for which the accelerator operation amount is 0 becomes equal to or longer than a reference time in a situation in which the override control is being executed.

Still another aspect of the present disclosure provides a storage medium storing a travel control program to be applied to a vehicle including a drive control device that controls a drive force of a vehicle according to at least an accelerator operation amount and a braking control device that decelerates the vehicle by applying a braking force to wheels, the program causing an electronic control device mounted on the vehicle to execute a process including executing vehicle speed limit control for limiting the drive force by controlling the drive control device when a vehicle speed exceeds a limit vehicle speed, and executing override control for canceling limitation on the drive force until the vehicle speed becomes equal to or less than the limit vehicle speed when the accelerator operation amount is increased by a driver during execution of the vehicle speed limit control.

The travel control program further includes decelerating the vehicle by controlling the braking control device when a time for which the accelerator operation amount is 0 becomes equal to or longer than a reference time in a situation in which the override control is being executed.

According to the travel control device, method, and storage medium described above, the vehicle is decelerated by controlling the braking control device when a time for which the accelerator operation amount is 0 becomes equal to or longer than a reference time in a situation in which the override control is being executed. Therefore, the override control during the vehicle speed limit control can be terminated early by increasing the deceleration of the vehicle compared to the conventional travel control device that decelerates the vehicle using the engine brake.

In addition, it is sufficient that the driving operation is maintained in the accelerator-off state so that the time for which the accelerator operation amount is 0 becomes equal to or longer than the reference time, and the braking operation does not need to be performed. Therefore, the driver does not need to shift the drive operation from the driving operation with the accelerator pedal to the braking operation with the brake pedal in order to terminate the override control as desired, reducing the possibility that the driver feels annoyed.

In one aspect of the present disclosure, the control unit is configured to compute, when the time for which the accelerator operation amount is 0 becomes equal to or longer than the reference time in a situation in which the override control is being executed, a target deceleration of the vehicle so as to gradually increase from a deceleration of the vehicle at a time point when the time for which the accelerator operation amount is 0 becomes equal to or longer than the reference time, and decelerate the vehicle by controlling the braking control device such that the deceleration of the vehicle becomes the target deceleration.

According to the above aspect, the target deceleration of the vehicle is computed so as to gradually increase from the deceleration of the vehicle at the time when the time for which the accelerator operation amount is 0 becomes equal to or longer than the reference time, and the vehicle is decelerated by controlling the braking control device such that the deceleration of the vehicle becomes the target deceleration. Therefore, when the deceleration of the vehicle is started by controlling the braking control device, it is possible to suppress the deceleration of the vehicle being suddenly changed and an occupant of the vehicle feeling uncomfortable with such a change.

In another aspect of the present disclosure, the control unit is configured to compute a target deceleration of the vehicle so as to gradually increase to a maximum target deceleration set in advance.

According to the above aspect, the control unit is configured to compute a target deceleration of the vehicle so as to gradually increase to a maximum target deceleration set in advance. Therefore, it is possible to suppress the target deceleration of the vehicle being suddenly changed and the deceleration of the vehicle being suddenly changed due to such a change, and it is also possible to suppress the target deceleration of the vehicle becoming excessive and the deceleration of the vehicle becoming excessively large due to such a change.

In the above description, in order to help understanding of the present disclosure, the names and/or the reference signs used in the embodiment are added in parentheses to the components of the disclosure corresponding to the embodiment to be described later. However, the constituent elements of the present disclosure are not limited to the constituent elements of the embodiment corresponding to the names and/or the reference signs added in parentheses. Other objects, other features, and accompanying advantages of the present disclosure will be readily understood from the description of the embodiment of the present disclosure made with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flow chart corresponding to a braking force control program.

DETAILED DESCRIPTION OF EMBODIMENTS

Hereinafter, a travel control device according to an embodiment of the present disclosure will be described in detail with reference to the accompanying drawings.

Figure 1:
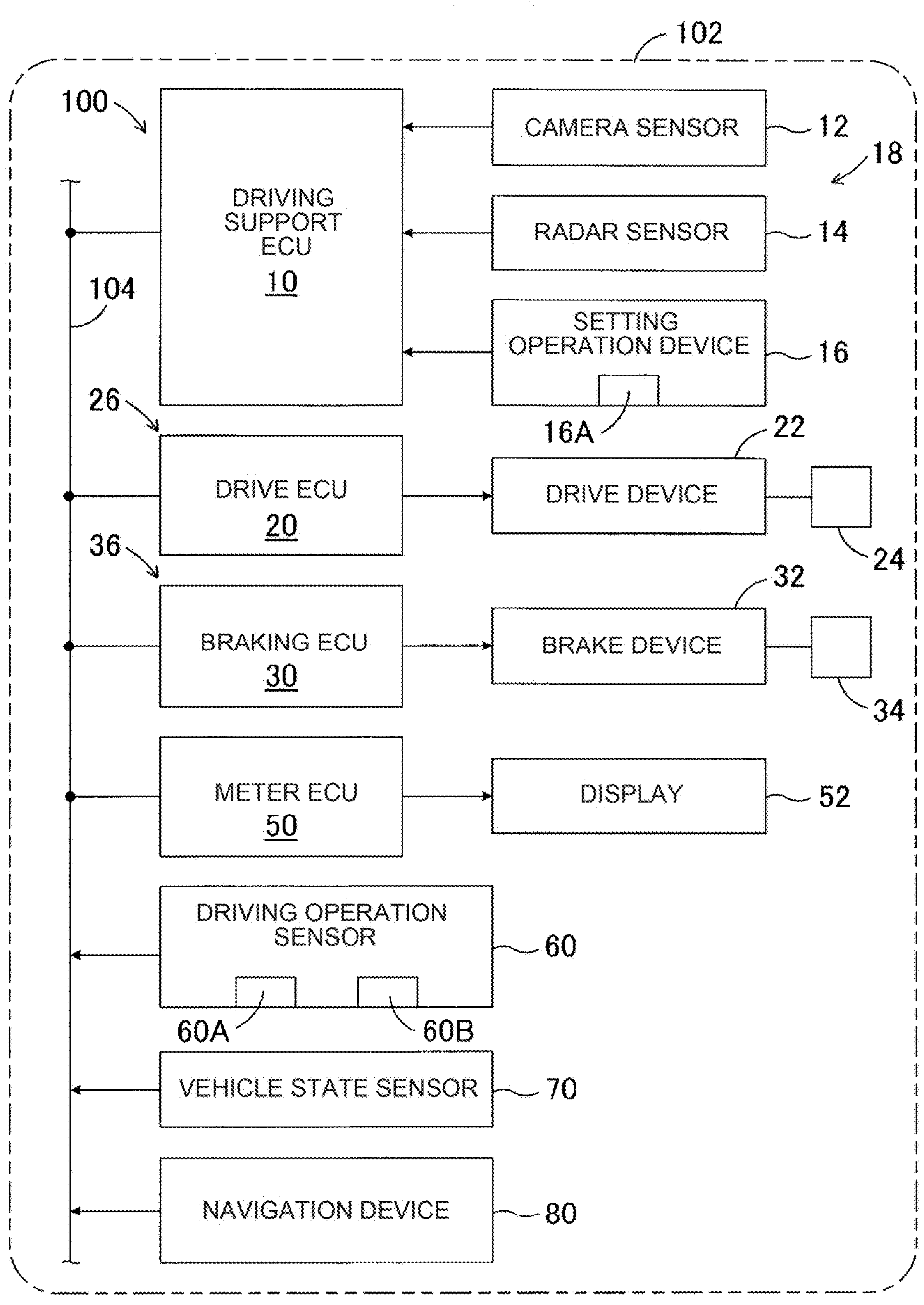
FIG. 1 is a schematic configuration diagram showing an embodiment of a vehicle travel control device according to the present disclosure.

As shown in FIG. 1, a travel control device 100 according to an embodiment of the present disclosure is applied to vehicles 102 and includes a driving assistance ECU 10. The vehicle 102 is a vehicle capable of autonomous driving, and includes a driving ECU 20, a braking ECU 30, and a meter ECU 50. ECU means an Electronic Control Unit including a microcomputer as a main part.

A microcomputer of each ECU includes a central processing unit (CPU), a read-only memory (ROM), a random access memory (RAM), a readable and writable non-volatile memory (N/M), an interface (I/F), and the like. The CPU realizes various functions by executing instructions (programs, routines) stored in the ROM. Furthermore, these ECU are connected to each other in a data-exchangeable manner via a Controller Area Network (CAN) 104. Therefore, detected values of sensors (including switches) connected to a specific ECU are transmitted to other ECUs as well.

The driving assistance ECU 10 is a central control device that performs driving assistance travel control such as vehicle speed limit control, tracking inter-vehicle distance control, and lane keeping control. In an embodiment, the driving assistance ECU 10 cooperates with other ECU to perform travel control for the vehicles 102, as will be described further below.

In the embodiment, the driving assistance ECU 10 sets the restricted vehicle speed Vlim, and when it is determined that the vehicle speed V of the vehicle 102 exceeds the restricted vehicle speed Vlim, executes the vehicle speed limit control for automatically limiting the driving force of the vehicle so that the vehicle speed becomes equal to or lower than the restricted vehicle speed. Further, when a driving operation for overriding the automatic limit of the driving force is performed during execution of the vehicle speed limit control, the automatic limit of the driving force is released. Thus, the travel control device 100 functions as an Adjustable Speed Limiter (ASL).

A camera sensor 12, a radar sensor 14, and a setting operation device 16 are connected to the driving assistance ECU 10. The camera sensor 12 and radar sensor 14 each include a plurality of camera devices and a plurality of radar devices. The camera sensor 12 and the radar sensor 14 function as a target information acquisition device 18 that acquires target information around the vehicle 102.

Each camera device of the camera sensor 12 includes a camera unit that captures an image of the surroundings of the vehicle 102, and a recognition unit that analyzes image data obtained by capturing an image by the camera unit and recognizes a target such as a white line of a road, a road sign, and the like, although not shown in the drawing. The road sign includes a road surface sign. The recognition unit supplies information about the recognized target to the driving assistance ECU 10 at predetermined intervals. When the information of the road sign supplied from the camera sensor 12 is the information of the road sign indicating the restricted vehicle speed, the driving assistance ECU 10 determines the restricted vehicle speed Vlimc based on the information.

Each radar device of the radar sensor 14 includes a radar transceiver and a signal processor (not shown). The radar transmitting/receiving unit emits a radio wave (hereinafter, referred to as "millimeter wave") in a millimeter wave band, and receives a millimeter wave (that is, a reflected wave) reflected by a three-dimensional object (for example, another vehicle, a bicycle, or the like) existing in a radiation range. The signal processor supplies the information to the driving assistance ECU 10 at predetermined time intervals based on the phase difference between the transmitted millimeter wave and the received reflected wave, the attenuation level of the reflected wave, the time from the transmission of the millimeter wave until the reception of the reflected wave, and the like. The information represents a distance between the host vehicle and the three-dimensional object, a relative speed between the host vehicle and the three-dimensional object, a relative position (direction) of the three-dimensional object with respect to the host vehicle, and the like. Incidentally, in lieu of the radar sensor 14, or in addition to the radar sensor 14, Light Detection And Ranging (LiDAR) may be used.

The setting operation device 16 is provided at a position that can be operated by a driver, such as a steering wheel (not shown in FIG. 1), and is operated by the driver. Although not shown in FIG. 1, the setting operation device 16 includes an ASL operating device 16A that functions as a limited vehicle speed setting device. The driving assistance ECU 10 executes the vehicle speed limit control when the main switch of ASL operating device 16A is on, as will be described later. ASL operating device 16A is configured to change and set the restricted vehicle speed Vlima by operating a button. For a detailed description of ASL operating device, see, for example, Japanese Unexamined Patent Application Publication No. 2017-1406 (JP 2017-1406 A) of the applicant's application, if required.

A drive device 22 that accelerates the vehicles 102 by applying a driving force to the driving wheels 24 is connected to the driving ECU 20. In a normal state, the driving ECU 20 controls the drive device 22 so that the driving force generated by the drive device 22 changes in response to a driving operation by the driver, and when a command signal is received from the driving assistance ECU 10, controls the drive device 22 based on the command signal. Thus, the driving ECU 20 and the drive device 22 cooperate with each other to function as the drive control device 26.

The drive device may be any drive device known in the art. For example, the drive device is a so-called hybrid system that is a combination of an engine and a transmission, an engine and a motor, a so-called plug-in hybrid system, a combination of a fuel cell and a motor, and a motor.

A braking device 32 is connected to the braking ECU 30 to decelerate the vehicles 102 by braking by applying a braking force to the wheels 34. The braking ECU 30 controls the braking device so that the braking force generated by the braking device 32 changes in response to a braking operation by the driver in a normal state. Upon receiving the command signal from the driving assistance ECU 10, the braking ECU 30 performs the automated braking by controlling the braking device 32 based on the command signal.

Thus, the braking ECU 30 and the braking device 32 cooperate with each other to function as the braking control device 36. When braking force is applied to the wheels by vehicle speed limit control or the like, a brake lamp (not shown in FIG. 1) is turned on.

The meter ECU 50 is connected with a touch panel type display 52 that displays a state of control by the driving assistance ECU 10 and the like. The display 52 may be, for example, a multi-information display in which meters and various types of information are displayed, or may be a display of the navigation device 80 described later. As will be described later, when receiving a signal from the driving assistance ECU 10, the display 52 displays the state of the vehicle speed limit control, the restricted vehicle speed Vlim, and the like.

The driving operation sensor 60 and the vehicle-state sensor 70 are also connected to CAN 104. Information detected by the driving operation sensor 60 and the vehicle state sensor 70 (hereinafter referred to as sensor information) is transmitted to the CAN 104. The sensor information transmitted to the CAN 104 can be appropriately used in each ECU. Note that the sensor information may be information of a sensor connected to a specific ECU, and may be transmitted from the specific ECU to the CAN 104.

The driving operation sensor 60 includes an accelerator operation amount sensor 60A, a braking operation amount sensor, and a brake switch. The accelerator operation amount sensor 60A detects an accelerator operation amount ACC which is a driving manipulation amount. The braking operation amount sensor detects a pedaling force with respect to the master cylinder pressure or the brake pedal. The brake switch detects whether or not the brake pedal is operated. The driving operation sensor 60 includes a kickdown switch 60B. The kickdown switch 60B is switched on when the accelerator operation amount ACC becomes equal to or larger than the start reference value (positive constant), and is switched off when the accelerator operation amount ACC becomes equal to or smaller than the end reference value (positive constant smaller than the start reference value). Further, the driving operation sensor 60 includes a steering angle sensor for detecting a steering angle, a steering torque sensor for detecting a steering torque, and the like.

The vehicle state sensor 70 includes a vehicle speed sensor that detects the vehicle speed V of the vehicle 102, a longitudinal acceleration sensor that detects longitudinal acceleration of the vehicle 102, a lateral acceleration sensor that detects lateral acceleration of the vehicle 102, a yaw rate sensor that detects a yaw rate of the vehicle 102.

In addition, a navigation device 80 is also connected to CAN 104. The navigation device 80 includes a global positioning system (GPS) receiver that detects the position of the vehicle 102, a storage device that stores map information and road information, and a communication device that acquires the latest information of the map information and the road information from the outside. In particular, the roadway information includes information on the restricted vehicle speed Vlimn. The navigation device 80 extracts information of the restricted vehicle speed Vlimn representing the restricted vehicle speed on the traveling road on which the vehicle is currently traveling, based on the position of the vehicle on the map and the road information. The navigation device 80 outputs the extracted information of the restricted vehicle speed to the driving assistance ECU 10 via CAN 104. Note that the navigation device 80 may not be provided.

The driving assistance ECU 10 sets the restricted vehicle speed Vlim based on the restricted vehicle speed Vlima set by the restricted vehicle speed Vlimc, ASL operator set based on the information of the road sign supplied from the camera sensor 12 and the restricted vehicle speed Vlimn extracted by the navigation device 80. For example, the restricted vehicle speed Vlim may be set by selecting one of Vlimc, Vlima and Vlimn according to preset priorities.

Figure 2:
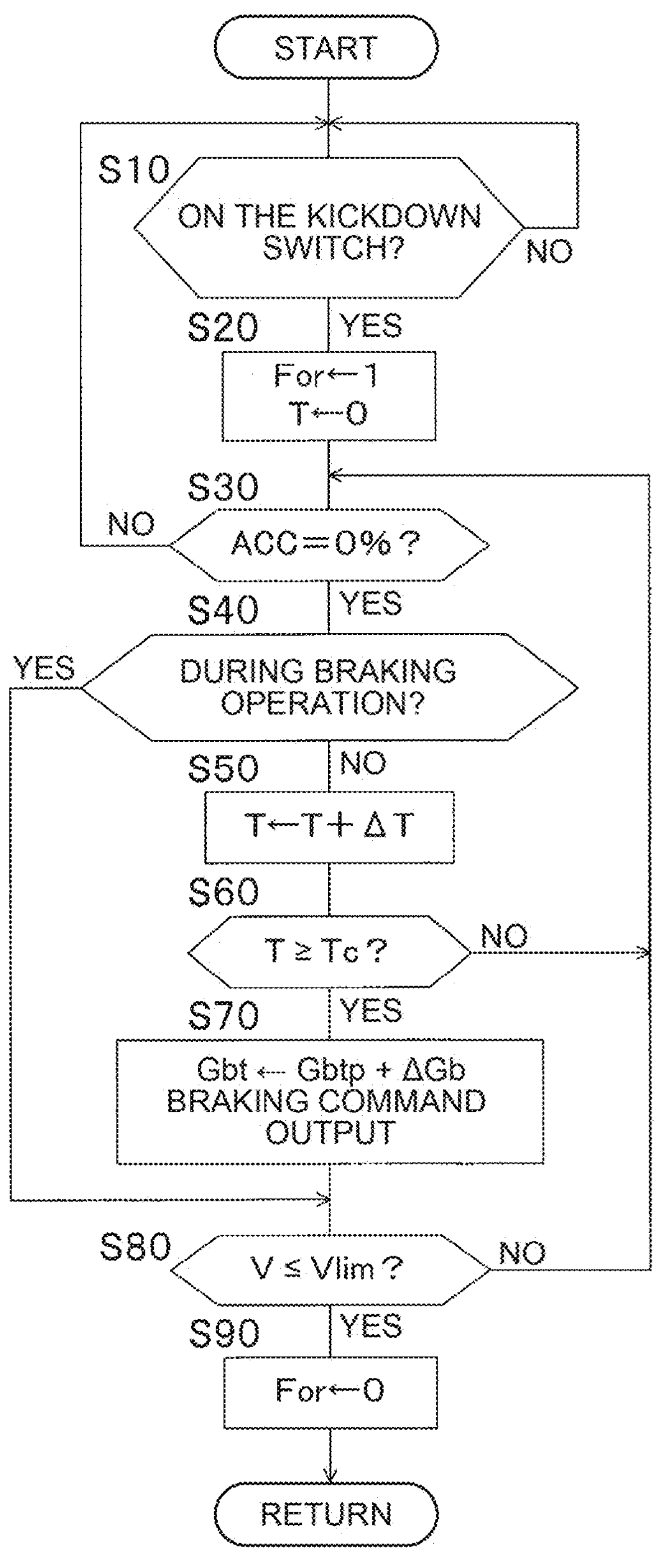
FIG. 2 is a flowchart corresponding to an override control program.
Figure 3:
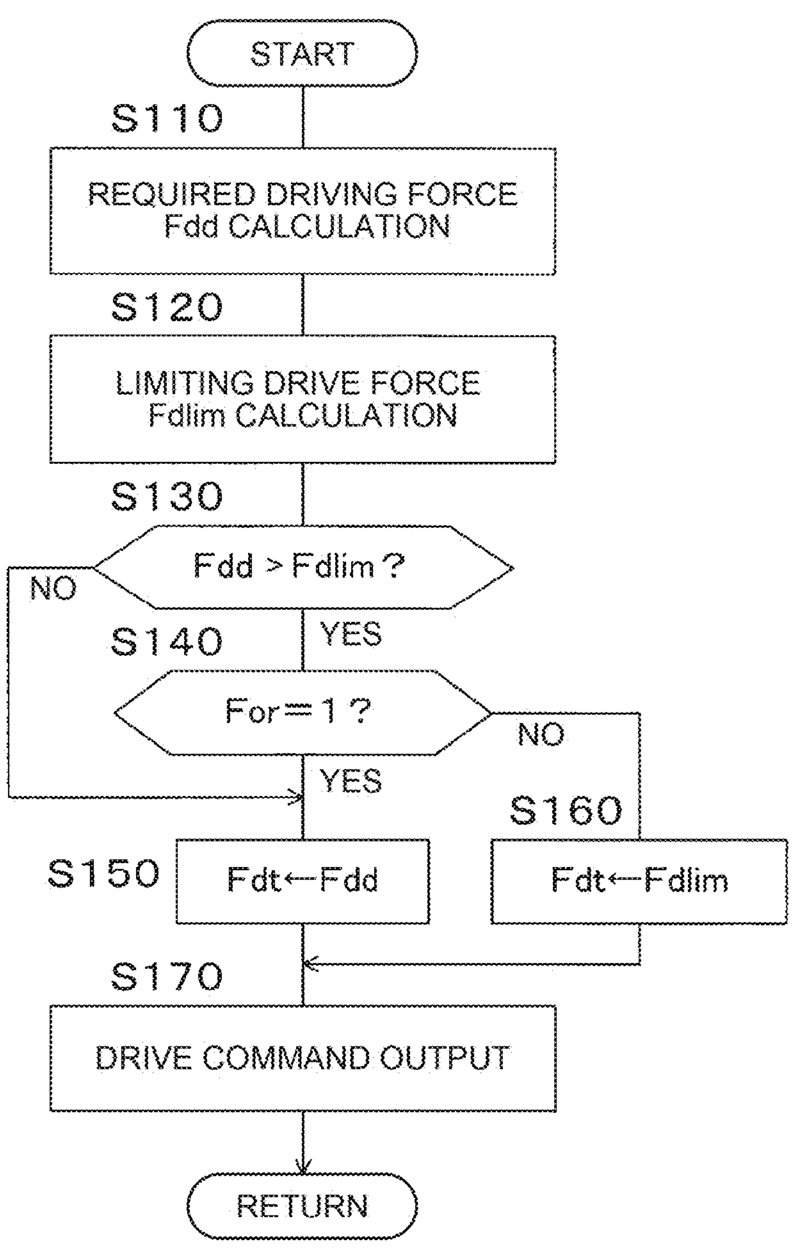
FIG. 3 is a flowchart corresponding to a driving force control program for vehicle speed limitation.

In the embodiment, ROM of the driving assistance ECU 10 stores an override control program corresponding to the flow charts shown in FIGS. 2 and 3 and a driving force control program for limiting the vehicle speed. Further, ROM of the braking ECU 30 stores a braking force control program for limiting the vehicle speed corresponding to the flow chart shown in FIG. 4. The ROM of the driving assistance ECU 10 and the ROM of the braking ECU 30 are each an example of a storage medium.

Figure 4:
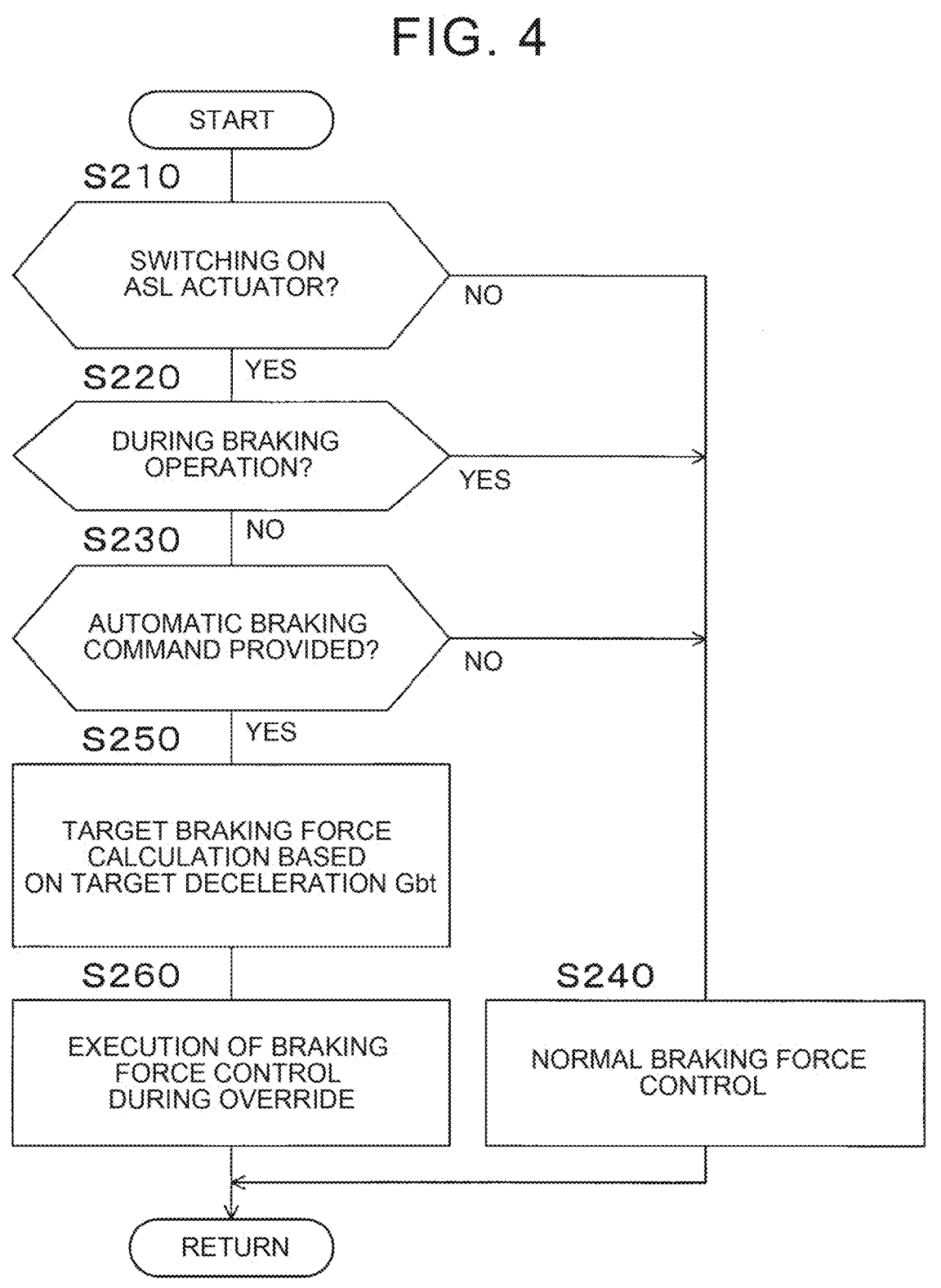

The vehicle travel control method according to the embodiment is executed by executing the override control, the drive force control for limiting the vehicle speed, and the braking force control for limiting the vehicle speed in accordance with the flowcharts illustrated in FIGS. 2 to 4.

Override Control (FIG. 2)

Next, the override control in the embodiment will be described with reference to the flowchart shown in FIG. 2. The override control according to the flow chart shown in FIG. 2 is repeatedly executed at predetermined intervals by CPU of the driving assistance ECU 10 in a situation where the main switch of ASL operating device 16A is on. When the override control is started, the flag For is initialized to 0.

First, in S10, CPU determines whether or not the kick-down switch 60B is on, that is, whether or not the accelerator operation amount ACC is equal to or greater than the starting reference value. When a negative determination is made, the override control is temporarily terminated, and when an affirmative determination is made, the override control proceeds to S20.

In S20, CPU sets the flag For to 1 and resets the elapsed time T after the accelerator operation amount ACC becomes 0% to 0.

In S30, CPU determines whether or not the accelerator operation amount ACC is 0%, that is, whether or not the accelerator is off. When a negative determination is made, the override control is temporarily terminated, and when an affirmative determination is made, the override control proceeds to S40.

In S40, CPU determines whether or not a braking action is being performed by the driver. When an affirmative determination is made, the override control proceeds to S80, and when a negative determination is made, the override control proceeds to S50.

In S50, CPU increments the elapsed time T after the accelerator operation amount ACC becomes 0% by ΔT. ΔT is the cycle time (positive constant) of the override control according to the flowchart shown in FIG. 2.

In S60, CPU determines whether or not the elapsed time T is greater than or equal to the reference value Tc (for example, a positive constant such as 3 seconds), that is, whether or not the deceleration of the vehicle 102 by the auto braking should be started. When a negative determination is made, the override control returns to S30, and when an affirmative determination is made, the override control proceeds to S70.

In S70, CPU increments the target deceleration Gbt of the vehicle 102 by ΔGb (negative constant), and outputs a command signal for the automatic braking based on the target deceleration Gbt to the braking ECU 30. The target deceleration Gbt is a negative value because it is a negative acceleration target value. When the target deceleration Gbt exceeds the maximum value Gbtmax (negative constant) of the deceleration by increment, the target deceleration Gbt is limited to the maximum value Gbtmax.

In S80, CPU determines whether or not the vehicle speed V is equal to or less than the restricted vehicle speed Vlim. When a negative determination is made, the override control returns to S30, and when an affirmative determination is made, the override control proceeds to S90.

In S90, CPU resets the flag For to 0 and then terminates the override control once.

Driving Force Control for Vehicle Speed Limit (FIG. 3)

Next, the driving force control for limiting the vehicle speed will be described with reference to the flowchart shown in FIG. 3. The driving force control for limiting the vehicle speed according to the flow chart shown in FIG. 3 is also repeatedly executed at predetermined intervals by CPU of the driving assistance ECU 10 in a situation where the main switch of ASL operating device 16A is on.

In S110, CPU calculates the required driving force Fdd of the driver in a manner known in the art based on the accelerator operation amount ACC.

In S120, CPU calculates the limited driving force Fdlim of the vehicle 102 for limiting the vehicle speed V to the limited vehicle speed Vlim or less, based on the current vehicle speed V, the limited vehicle speed Vlim, the current acceleration, and the like, in a manner known in the art.

In S130, CPU determines whether or not the required driving force Fdd is larger than the limited driving force Fdlim, that is, whether or not a limit of the driving force by the limited driving force Fdlim is required. When a negative determination is made, the driving force control proceeds to step 150, and when an affirmative determination is made, the driving force control proceeds to S140.

In S140, CPU determines whether or not the flag For is 1, that is, whether or not the override for releasing the limit of the driving force is being performed. When the affirmative determination is made, the target driving force Fdt of the vehicle 102 is set to the required driving force Fdd in S150, and when the negative determination is made, the target driving force Fdt of the vehicle 102 is set to the limit driving force Fdlim in S160.

In S170, CPU outputs a command signal for setting the driving force Fd of the vehicles 102 to the target driving force Fdt to the driving ECU 20. As a result, the drive device 22 is controlled by the driving ECU 20 so that the driving force Fd of the vehicles 102 becomes the target driving force Fdt.

Therefore, when the required driving force Fdd is larger than the limit driving force Fdlim and the flag For is 0, the target driving force Fdt is set to the limit driving force Fdlim, and the driving force Fd of the vehicle 102 is controlled to be the limit driving force Fdlim. On the other hand, even if the required driving force Fdd is larger than the limit driving force Fdlim, the flag For is 1 and the override is being performed in some cases. In this case, the target driving force Fdt is set to the required driving force Fdd, and the driving force Fd of the vehicle 102 is controlled to be the required driving force Fdd, and is not limited by the limited driving force Fdlim.

Braking Force Control for Vehicle Speed Limit (FIG. 4)

Next, the braking force control for limiting the vehicle speed will be described with reference to the flowchart shown in FIG. 4. The braking force control for limiting the vehicle speed according to the flow chart shown in FIG. 4 is repeatedly executed at predetermined intervals by CPU of the braking ECU 30 in a situation where the ignition switch not shown in FIG. 1 is on.

In S210, CPU determines whether the main switch of ASL operating device 16A is on. When an affirmative determination is made, the braking force control proceeds to S240, and when a negative determination is made, the braking force control proceeds to S220.

In S220, CPU determines whether or not a braking action is being performed by the driver. When an affirmative determination is made, the braking force control proceeds to S240, and when a negative determination is made, the braking force control proceeds to S230.

In S230, CPU determines whether or not an auto braking command based on the target deceleration Gbt is inputted from the driving assistance ECU 10. When a negative determination is made, the braking force control proceeds to S240, and when an affirmative determination is made, the braking force control proceeds to S250.

In S240, CPU controls the braking device 32 based on the braking operation amount detected by the braking operation amount sensor of the driving operation sensor 60. For example, CPU calculates the target braking force Fbt of the vehicles 102 in a manner known in the art based on the braking manipulated variable. Further, CPU calculates the target braking force of each wheel based on the target braking force Fbt, and controls the braking device 32 so that the braking force of each wheel becomes the corresponding target braking force.

In S250, CPU calculates the target braking force of the respective wheels in a manner known in the art based on the target deceleration Gbt calculated in S70 and inputted from the driving assistance ECU 10.

In S260, CPU controls the braking control device 36 so that the braking force of the respective wheels becomes the corresponding target braking force. Accordingly, the vehicle is decelerated by the automatic braking during the override.

Operation and Effect of the Embodiment

Next, with reference to FIG. 5, the vehicle speed limit control according to the embodiment will be described as an example of the operation of the embodiment. Note that the second stage in FIG. 5 indicates a change in the acceleration of the vehicle 102, and a negative value of the acceleration indicates a deceleration Gb of the vehicle.

Figure 5:
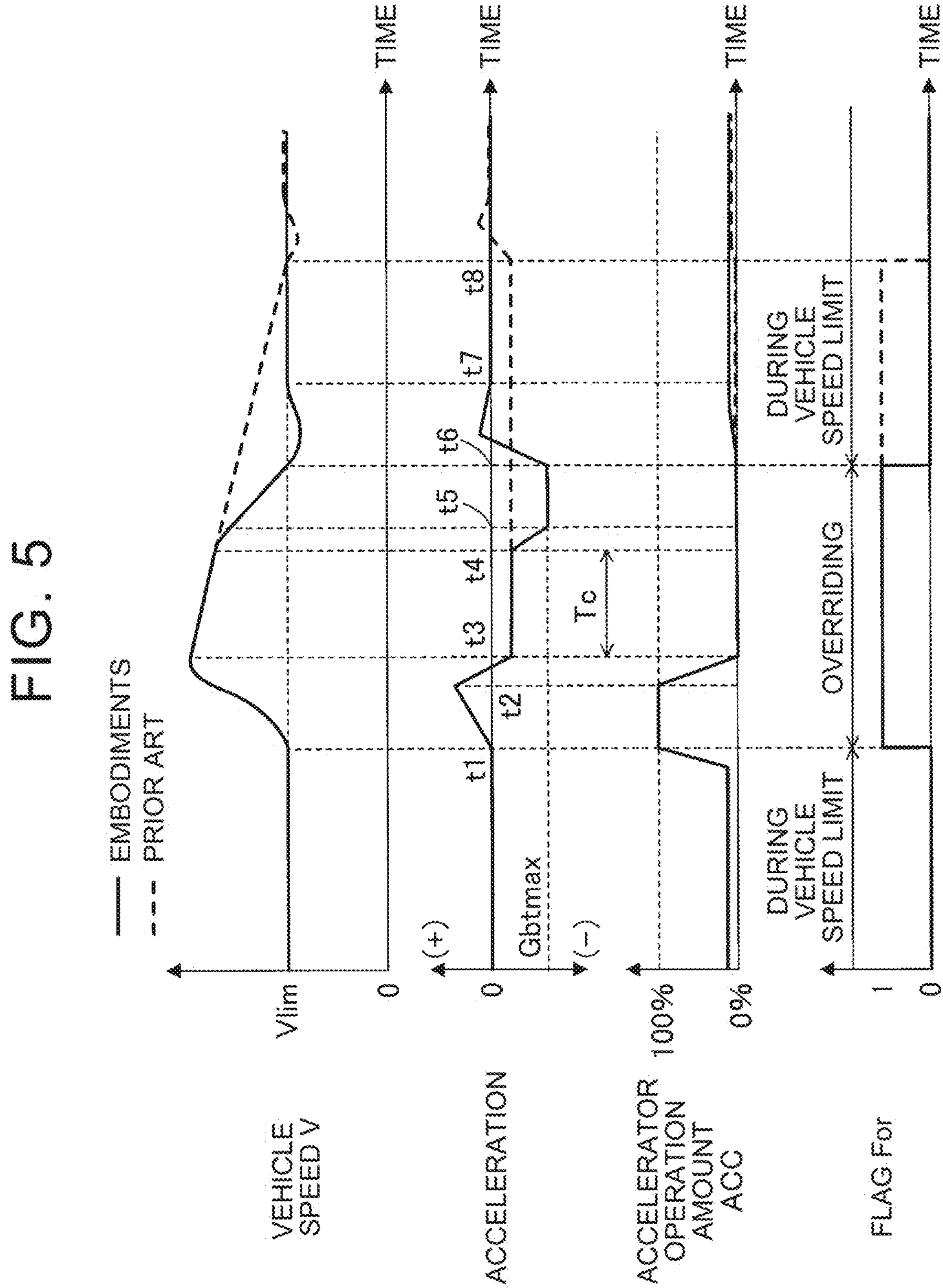
FIG. 5 is a diagram illustrating an example of operation of the embodiment.

As shown in FIG. 5, it is assumed that the brake pedal is suddenly depressed by the driver immediately before the time point t1, and the kickdown switch 60B is turned on at the time point t1. In S10, an affirmative determination is made, and in S20, the flag For is set to 1, and the override control is started. The vehicle speed V and the acceleration change in accordance with the accelerator operation amount ACC, and the vehicle speed V becomes higher than the restricted vehicle speed Vlim.

It is assumed that, at the time point t2, the reduction of the depression of the brake pedal is started by the driver, whereby the accelerator operation amount ACC starts to decrease from 100%, and at the time point t3, the accelerator operation amount ACC decreases to 0%, and the determination of S30 becomes affirmative. After the time point t3, the vehicle is decelerated by the engine braking, and the vehicle speed V gradually decreases.

It is assumed that, at the time point t4, the elapsed time from the time point t3 becomes equal to or longer than the reference elapsed time Tc, and the determination of S60 becomes affirmative. It is assumed that the target deceleration Gbt of the vehicle 102 increases from the time point t4 to the time point t5, and reaches the maximum value Gbtmax at the time point t5. Since the vehicle is decelerated by the automatic braking based on the target deceleration Gbt after the time point t4, the degree of decrease of the vehicle speed V after the time point t4 is higher than the degree of decrease from the time point t3 to the time point t4.

When the vehicle speed V becomes equal to or lower than the restricted vehicle speed Vlim and the determination of S80 becomes affirmative at the time point t6, the flag For is reset to 0 in S90, and the override control is ended. In S130, a negative determination is made, and S150 is executed, whereby the deceleration Gb of the vehicles 102 is decreased from the maximum value Gbtmax. The vehicle speed V rises after being slightly lower than the restricted vehicle speed Vlim, and becomes the restricted vehicle speed Vlim at a time point t7, for example.

In the conventional travel control device, when the accelerator operation amount ACC is 0%, the vehicle is decelerated by the engine brake, and even if the elapsed time from the time point t3 becomes equal to or longer than the reference elapsed time Tc, the deceleration by the automatic braking is not performed. Therefore, as indicated by a broken line in FIG. 5, the vehicle speed V decreases at the same degree of decrease as the degree of decrease from the time t4 to the time t3 even after the time point. Therefore, the vehicle speed V becomes equal to or lower than the restricted vehicle speed Vlim at the time point t8, the override control continues from the time point t1 to the time point t8, and takes a long time until the vehicle speed V decreases to the restricted vehicle speed Vlim or lower.

On the other hand, according to the embodiment, the vehicle speed V decreases to be equal to or lower than the restricted vehicle speed Vlim at a time point t6 much earlier than the time point t8. Therefore, the override control during the vehicle speed limit control ends earlier than in the related art.

As can be seen from the above explanation, according to the travel control device, the method, and the program of the present disclosure, when the time T at which the accelerator operation amount ACC is 0% becomes equal to or more than the reference time Tc (S30, S50, S60), the braking control device 36 is controlled. As a result, the vehicles 102 are automatically decelerated (S70). Therefore, compared with the conventional travel control device in which the vehicle is decelerated by the engine brake, the deceleration Gb of the vehicle can be increased, and the override control during the vehicle speed limit control can be terminated at an early stage.

In addition, the driving operation need only be maintained in the accelerator-off state so that the time T at which the accelerator operation amount ACC is 0% is equal to or more than the reference time Tc, and the braking operation need not be performed. Therefore, the driver does not need to shift the driving operation from the driving operation with respect to the accelerator pedal to the braking operation with respect to the brake pedal in order to end the override control as desired.

In particular, according to the embodiment, the target deceleration Gbt of the vehicle 102 is calculated to gradually increase from the deceleration of the vehicle at the time when the time T at which the accelerator operation amount ACC is 0% becomes equal to or more than the reference time Tc (S70). By controlling the braking control device 36 so that the deceleration Gb of the vehicle becomes the target deceleration, the vehicle is decelerated (S70, S230, S250, S260). Therefore, when the deceleration of the vehicle is started due to the control of the braking control device, it is possible to suppress the deceleration of the vehicle suddenly changing and the occupant of the vehicle from feeling uncomfortable due to this.

Further, according to the embodiment, the target deceleration Gbt of the vehicles 102 is calculated so as to gradually increase to a preset maximal target deceleration Gbtmax (S70). Therefore, it is possible to suppress the target deceleration of the vehicle suddenly changing and the deceleration Gb of the vehicle from suddenly changing due to the sudden change, and it is also possible to suppress the target deceleration of the vehicle becoming excessive and the deceleration of the vehicle from becoming excessively large due to this.

Further, according to the embodiment, the restricted vehicle speed Vlim is variably set based on the restricted vehicle speed Vlima set by the restricted vehicle speed Vlimc, ASL operator set based on the information of the road sign and the restricted vehicle speed Vlimn extracted by the navigation device 80. Therefore, the restricted vehicle speed Vlim can be automatically set in accordance with the restricted vehicle speed of the road on which the vehicle travels. In addition, the driver can variably set the restricted vehicle speed Vlimn according to his or her intention.

The present disclosure has been described in detail above with respect to specific embodiments. However, it is obvious to those skilled in the art that the present disclosure is not limited to the above-described embodiments, and various other embodiments are possible within the scope of the present disclosure.

For example, in the above-described embodiment, the restricted vehicle speed Vlim is variably set based on the restricted vehicle speed Vlima set by the restricted vehicle speed Vlimc, ASL operator set based on the information of the road sign and the restricted vehicle speed Vlimn extracted by the navigation device 80. However, the limited vehicle speed Vlim may be a preset constant.

Further, in the above-described embodiment, the restricted vehicle speed Vlim is variably set based on the restricted vehicle speed Vlimc, Vlima and Vlimn. However, at least one of the variable setting of the restricted vehicle speed Vlimc based on the information of the road sign, the variable setting of the restricted vehicle speed Vlimc based on the information of ASL sign by Vlima operator, and the variable setting of Vlimn by the navigation device 80 may be omitted.

Further, in the above-described embodiment, the driving operation sensor 60 includes a kickdown switch 60B, and when the kickdown switch is on, the override control is started (S10, S20). However, the kickdown switch may be omitted, and in S10, it may be determined whether or not the accelerator operation amount ACC is equal to or greater than the start reference value, and the override control may be started when an affirmative determination is made.

Further, in the above-described embodiment, in S60, it is determined whether or not the deceleration of the vehicle 102 by the auto braking should be started by determining whether or not the elapsed time T is equal to or more than the reference value Tc, and the reference value Tc is a positive constant. However, the reference value Tc may be variably set in accordance with the vehicle speed such that the higher the vehicle speed V, the earlier the deceleration by the automatic braking is started.

Further, in the above-described embodiment, in S70, the target deceleration Gbt of the vehicles 102 is incremented by $\Delta$Gb, and the increment $\Delta$Gb is a negative constant. However, the increment amount $\Delta$Gb may be variably set in accordance with the vehicle speed such that the higher the vehicle speed V, the higher the deceleration due to the automatic braking, and the higher the vehicle speed, the larger the absolute value.

What is claimed is:

1. A vehicle travel control device comprising:

a drive electronic control unit (ECU) configured to output a signal to control a drive force of a vehicle according to at least an accelerator operation amount;

a braking ECU configured to output a signal to apply a braking force to wheels according to at least a braking operation amount to decelerate the vehicle; and a driving assistance ECU configured to start execution of vehicle speed limit control in response to a detection that a vehicle speed exceeds a limit vehicle speed, the vehicle speed limit control including causing the driving assistance ECU to control the drive force such that the vehicle speed does not exceed the limit vehicle speed, start execution of override control for canceling limitation on the drive force in response to an operation by a driver in which the accelerator operation amount is equal to or greater than a predetermined operation value during execution of the vehicle speed limit control, determine whether the accelerator operation amount is 0, determine whether the braking operation amount is 0, update an elapsed time after the accelerator operation amount becomes 0, in response to determination that the accelerator operation amount is 0 and the braking operation amount is 0 during the execution of the override control, determine whether the elapsed time is equal to or longer than a reference time, and decelerate the vehicle by causing the braking ECU to control the braking force in response to determination that the elapsed time is equal to or longer than the reference time.

2. The vehicle travel control device according to claim 1, wherein the driving assistance ECU is further configured to compute, in a case where the determination is made that the elapsed time is equal to or longer than the reference time, a target deceleration of the vehicle so as to gradually increase from a deceleration of the vehicle at a time point when the elapsed time becomes equal to or longer than the reference time, and the vehicle is decelerated by causing the braking ECU to control the braking force such that the deceleration of the vehicle becomes the target deceleration.

3. The vehicle travel control device according to claim 1, wherein the driving assistance ECU is further configured to compute a target deceleration of the vehicle so as to gradually increase to a maximum target deceleration set in advance.

4. The vehicle travel control device according to claim 1, wherein the driving assistance ECU is further configured to determine whether the vehicle speed is lower than the limit vehicle speed after starting deceleration of the vehicle during the execution of the override control, and terminate the execution of the override control in response to determination that the vehicle speed is lower than the limit vehicle speed after starting the deceleration of the vehicle during the execution of the override control.

5. The vehicle travel control device according to claim 1, wherein the reference time is set to be smaller when the vehicle speed is a first speed than when the vehicle speed is a second speed which is lower than the first speed.

6. A vehicle drive control method to be applied to a vehicle, the vehicle including a drive control device that controls a drive force of the vehicle according to at least an accelerator operation amount, and a braking control device that decelerates the vehicle by applying a braking force to wheels according to a braking operation amount, and the method comprising:

starting execution of vehicle speed limit control in response to a detection that a vehicle speed exceeds a limit vehicle speed, the vehicle speed limit control including controlling the drive control device to limit the drive force such that the vehicle speed does not exceed the limit vehicle speed;

starting execution of override control for canceling limitation on the drive force in response to an operation by a driver in which the accelerator operation amount is equal to or greater than a predetermined operation value during execution of the vehicle speed limit control;

determining whether the accelerator operation amount is 0;

determining whether the braking operation amount is 0;

updating an elapsed time after the accelerator operation amount becomes 0, in response to determination that the accelerator operation amount is 0 and the braking operation amount is 0 during the execution of the override control;

determining whether the elapsed time is equal to or longer than a reference time; and decelerating the vehicle by controlling the braking control device in response to determination that the elapsed time is equal to or longer than the reference time.

* * * * *